United States Patent [19]
Hampton

[11] Patent Number: 6,062,541
[45] Date of Patent: *May 16, 2000

[54] PORTABLE JACKBOLT POSITIONING SYSTEM AND METHOD

[76] Inventor: Bryan D. Hampton, 18120 Foreman Ct., Linden, Calif. 95236

[ * ] Notice: This patent issued on a continued prosecution application filed under 37 CFR 1.53(d), and is subject to the twenty year patent term provisions of 35 U.S.C. 154(a)(2).

[21] Appl. No.: 08/565,842

[22] Filed: Dec. 1, 1995

[51] Int. Cl.[7] ....................................... B66F 3/08
[52] U.S. Cl. ............................ 254/98; 254/105; 248/651; 269/246
[58] Field of Search ...................... 269/119, 120, 269/240, 246, 71, 249, 251, 89, 151, 315, 177, 289, 291; 254/98, 105–108; 248/651

[56] References Cited

U.S. PATENT DOCUMENTS

| | | | |
|---|---|---|---|
| 162,281 | 4/1875 | Fisher, Jr. ............................. | 269/151 |
| 193,951 | 8/1877 | Heckert ................................ | 269/249 |
| 220,875 | 10/1879 | Shepperd ............................ | 269/249 |
| 292,207 | 1/1884 | Corbett ................................ | 269/249 |
| 455,414 | 7/1891 | Searle .................................. | 269/249 |
| 707,680 | 8/1902 | Worth .................................. | 269/240 |
| 1,145,199 | 7/1915 | Kobert ................................. | 269/246 |
| 1,246,466 | 11/1917 | Reeves ................................. | 269/246 |
| 1,766,230 | 6/1930 | Sea ...................................... | 269/246 |
| 1,973,238 | 9/1934 | Walter ................................. | 269/249 |
| 2,568,952 | 9/1951 | Dailey ................................. | 269/246 |
| 2,661,783 | 12/1953 | Caston ................................. | 269/246 |
| 2,698,550 | 1/1955 | Hill ..................................... | 269/249 |
| 2,724,296 | 11/1955 | Parrish et al. ....................... | 269/251 |
| 2,907,360 | 11/1959 | Metcalfe ............................. | 269/249 |
| 4,012,021 | 3/1977 | Duceppe ............................. | 248/651 |
| 4,022,430 | 5/1977 | Felder et al. ........................ | 254/106 |
| 4,084,369 | 4/1978 | Luebbers ............................ | 269/249 |
| 4,300,754 | 11/1981 | Lawrence ........................... | 269/246 |
| 4,418,901 | 12/1983 | Woods et al. ........................ | 269/71 |
| 4,790,507 | 12/1988 | Morrissey ........................... | 248/651 |
| 5,062,621 | 11/1991 | Mackey ............................... | 269/315 |

*Primary Examiner*—James G. Smith
*Assistant Examiner*—Lee Wilson
*Attorney, Agent, or Firm*—Limbach & Limbach

[57] ABSTRACT

A apparatus and method for moving and aligning objects such as machine components includes a plate positionable beneath and engageable with an object to be moved, a block engageable with the plate, and a bolt extending through a bore in the block. The bolt includes an end which is positionable adjacent to the object to be moved and which is rotatable within the bore to cause axial movement of the bolt. Such axial movement of the bolt causes the end of the bolt to push against the object to be moved and to thereby move the object.

7 Claims, 1 Drawing Sheet

PORTABLE JACKBOLT POSITIONING SYSTEM AND METHOD

FIELD OF INVENTION

This invention relates generally to devices and methods for moving machinery. In particular, it relates to a portable positioning device for effecting two dimensional movement and accurate horizontal positioning of machine elements to obtain, for example, precise alignment of those elements to other machine elements.

BACKGROUND OF THE INVENTION

The alignment of machinery and machine elements is a highly complex procedure which is critical in many contexts. For example, electric motors or other types of drivers must be placed in proper position to drive machines, such as rotary or centrifugal pumps, fans or the like. To do so, the output shaft of the motor must be closely aligned (that is, to within a few thousandths of an inch) with the input shaft of the machine which is to be driven. Once such alignment is achieved, the conventional flexible coupling between the machines compensates for any remaining offsets in the alignment of the machines and therefore provides an acceptable driving connection.

Existing devices for aligning machine elements such as drivers and input shafts include built-in jacking devices or common hand tools.

Conventional built-in jacking devices utilize transverse and longitudinal jackscrews which are permanently mounted to the driver at the baseplate or soleplate of the driver, with each jackscrew being mounted adjacent to one of the feet of the driver. Rotation of such jackscrews causes them to move axially and to thereby push against the driver feet to cause movement in the horizontal plane.

Although such jackscrews satisfactorily move and align machine components, their permanent affixation to the machine components (such as at the baseplate) presents some disadvantages with respect to their use. For example, separate jackscrews must be purchased for each foot of each component to be moved, since a jackscrew mounted to one component cannot be removed for use on different components.

Moreover, because conventional jackscrews must be permanently installed, difficulties may be encountered in situations where the machine components are not equipped with jackscrews prior to field installation of the machine components. For example, it may be difficult given the positioning and orientation of the components to install the jackscrews on site, or hotwork restrictions may preclude their installation in the field. Moreover, the permanently attached jackscrews may interfere during change out of components and also during cleaning of the machine baseplate.

Other tools that are commonly used (typically in combination) for horizontal movement and alignment of machine components include portable hydraulic jacks, wedges, pry bars, cranes, sledge hammers. Small machine elements may also be pushed by hand. Unfortunately, movement and alignment of machinery using such tools can be very time consuming, dangerous to personnel and machinery, and it often results in imprecise alignment of components.

An apparatus for moving and aligning is therefore desired which provides the ease and precision afforded by conventional jackbolt devices but which is capable of temporary attachment to machine components without loss of precision or effectiveness.

SUMMARY OF THE INVENTION

The present invention is an apparatus useable for moving objects. It includes a plate which is engageable with an object to be moved and which may be positioned beneath the object. A body engageable with the plate and carries a body having an end positionable adjacent the object to be moved. The member is moveable relative to the body to cause the end to push against the object to be moved.

The jackbolt device according to the present invention provides a portable, inexpensive, and simple to use device for positioning machine elements in the horizontal plane and for accurately aligning machine elements with corresponding machine components. Moreover, the plate provides an additional advantage in that it may also serve as a substitute for shims which are ordinarily used for adjusting vertical alignment of machine components.

DETAILED DESCRIPTION OF THE PREFERRED EMBODIMENT

Figure 1:
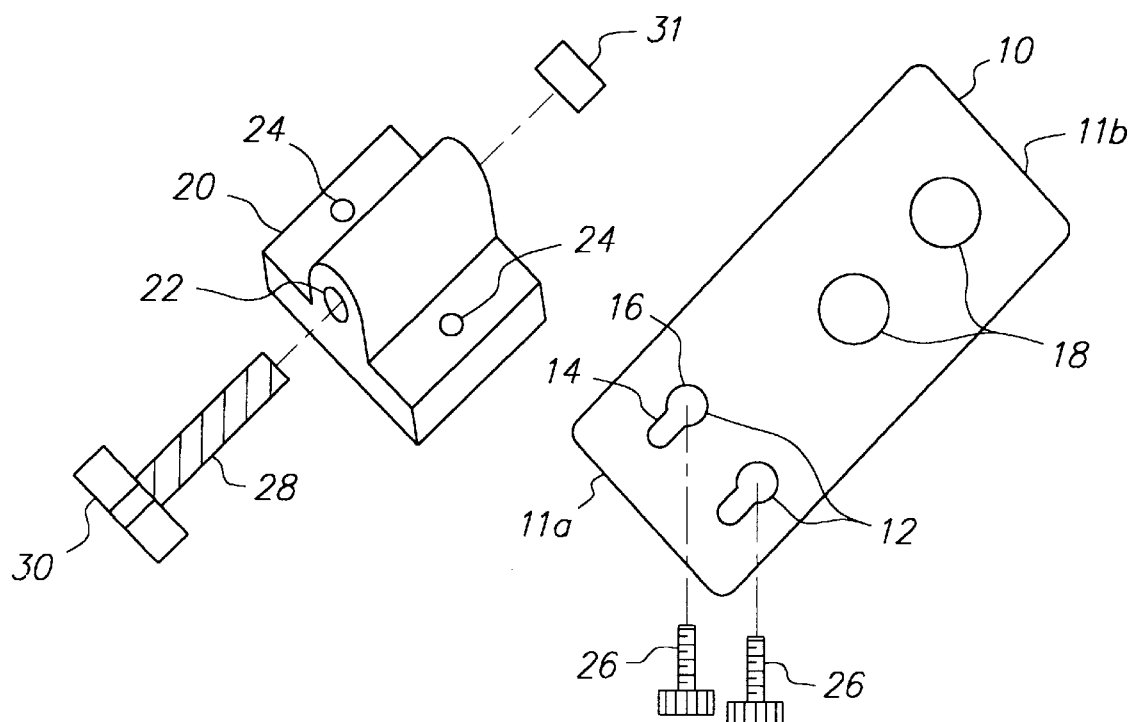
FIG. 1 is an exploded perspective view of a jackbolt device according to the present invention.
Figure 2:
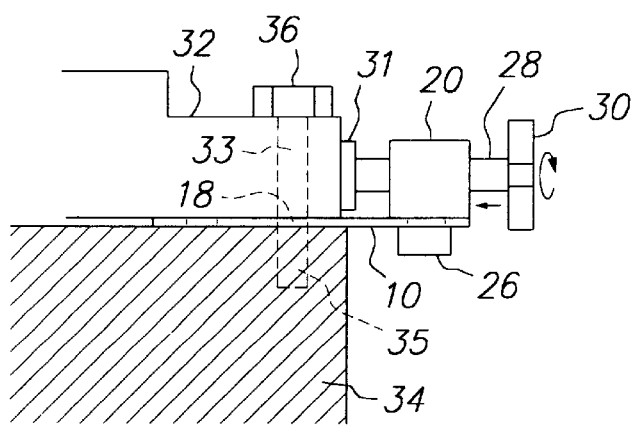
FIG. 2 is a side elevation view of the jackbolt device of FIG. 1.

Referring to FIG. 1, the portable jackbolt device according to the present invention includes a rectangular adapter plate 10 which is preferably made of 0.050"–0.125" thick steel or stainless steel or other material capable of withstanding the forces exerted during the moving operation. As described below, it may be desirable to provide the adapter plates in a variety of thicknesses as the adapter plates may additionally serve as shims which allow the vertical alignment of machinery to be adjusted.

Plate 10 includes first and second ends 11a, 11b. Plate mounting holes 12 are formed in the adapter plate 10 and are laterally spaced from one another near first end 11a. 10. Each hole 12 has a narrow end 14 and a wide end 16. A pair of hold down holes 18 are longitudinally spaced from one another towards second end 11b of the plate.

A mounting block 20 is provided which includes a longitudinally extending threaded bore 22. Second bores 24, which preferably are threaded, extend through the mounting block in a direction perpendicular to the longitudinal axis of bore 20. Threaded mounting screws 26 are provided for extending through plate mounting holes 12 and for engagement with the second bores 24 in the mounting block 20.

An adjusting screw 28 extends through longitudinally extending bore 22. A knob 30 is fixed to one end of the screw 28 and a swivel head 31 is rotatably attached to the other end of the screw 28.

Figure 3:
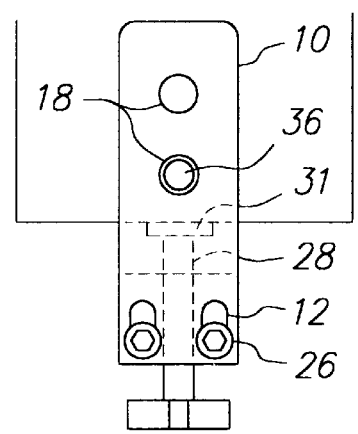
FIG. 3 is a bottom plan view of the jackbolt device of FIG. 1.

Referring to FIG. 3, a typical piece of heavy machinery is supported by one or more feet 32 which supports the machinery on top of a base plate 34. A hold down bolt 36 extends through a bore 33 in the foot 32 and through a corresponding bore 35 in the base plate 34 to secure the two together. The bore 33 is somewhat larger than the hold down bolt 36 so that when the foot is moved in the horizontal plane the bolt 36 (if sufficiently loosened) can move slightly within the bore 33 without causing the foot 32 and the base plate 34 to become detached from one another.

Installation and operation of the jackbolt device will next be described with respect to a foot and base plate configuration of this type.

Installation of the jackbolt device according to the present invention first requires removing the hold down bolt 36 and subsequently lifting the foot 32 (such as with a crow bar or by hand) to temporarily separate the foot 32 from the base plate 34.

With the foot 32 and base plate 34 separated, the adapter plate 10 is inserted between them such that one of the hold down holes 18 is aligned with bore 33 in the foot 32. Hold down bolt 36 is re-inserted into bore 33, then through the hold down hole 18 with which it is aligned, and then through the corresponding bore 35 in the base plate. Hold down bolt 36 is loosely tightened in this position.

Next, mounting block 20 is positioned such that bores 24 (FIG. 1) are aligned with the wide ends 16 of plate mounting holes 12. Mounting screws 26 are passed through the holes 12 and the bores 24 and are tightened slightly. The mounting block 20 is next moved horizontally to slide the screws 26 into the narrow ends 14 of the plate mounting holes 12 and the screws 26 are tightened in place. When the mounting block 20 is properly positioned, the swivel head 31 faces the foot and may be placed in contact with the foot by rotating the handle 30.

The above procedure is repeated using a separate adapter plate and mounting block for each foot of the machinery.

Once the adapter plates and mounting blocks are installed at each foot, horizontal movement of the machinery may be carried out by rotating the handle 30 on the adjusting screw 28 to cause longitudinal movement of the adjusting screw 28. Such movement causes the end of the adjusting screw 28 at which the swivel is located to bear against the foot and to thereby push the foot. The adjusting screw rotates within the swivel head to facilitate turning of the screw even when a great deal of force is being exerted against the foot.

The adapter plate 10 may be left in place so that future alignments may be performed with ease. If the adapter plate is left in place, hold down bolt 36 is tightened down to hold the foot 32, adapter plate 10, and base plate 34 tightly together. In this manner the adapter plate 10 can serve as a shim which adjusts the vertical alignment of the equipment. Adapter plates having various thicknesses may be provided to enable a user to select the thickness which would permit adjustment of the vertical alignment by a desired amount.

If it is instead preferable to remove the adapter plate 10, the hold down bolt 36 is temporarily removed and the adapter plate 10 slipped out from between the foot and the base plate. After the adapter plate 10 is removed, the hold down bolt 36 is replaced and tightened.

Although the present invention has been described with respect to a preferred embodiment, it should be appreciated that additional embodiments other than the one described above may be configured which lie within the scope of the present invention. The scope of the invention is defined not by the description of the preferred embodiment but instead by the following claims.

What is claimed is:

1. An apparatus for effecting movement of objects, comprising:
    a plate slidable into position beneath a portion of an object to be moved, the plate including an opening having a diameter;
    a hold down bolt extending through the opening in the plate and positioned for engagement with a bore in the object to be moved, the hold down bolt having a diameter that is sufficiently smaller than the diameter of the opening in the plate so as to permit radial movement of the hold down bolt relative to the opening in the plate;
    a body attachable to the plate;
    a member carried by the body and having an end positionable adjacent the object to be moved, the member moveable relative to the body to cause the end to push against the object to be moved and to cause the object to slide relative to the plate and to further cause radial movement of the hold down bolt within the opening in the plate.

2. The apparatus of claim 1 wherein the member includes a shaft and wherein the end of the shaft includes a head which is rotatable relative to the shaft.

3. The apparatus of claim 1 wherein the member is parallel to the plate.

4. An apparatus for effecting movement of objects, comprising:
    a plate slidable into position between a portion of an object to be moved and a base member for the object, the plate including an opening having a diameter;
    a hold down bolt extending through the opening in the plate and engageable with corresponding bores in the object to be moved and in the base member, the hold down bolt having a diameter sufficiently smaller than the diameter of the opening to permit relative radial movement between the hold down bolt and the opening;
    a body attachable to the plate and having a bore extending therethrough; and
    a bolt extending through the bore, the bolt having an end positionable adjacent an object to be moved, the bolt further being rotatable within the bore to cause axial movement of the bolt within the bore and to thereby cause the end to push against the object to be moved and to cause the object to slide relative to the plate and to further cause radial movement of the hold down bolt within the opening in the plate.

5. The apparatus of claim 4 wherein the bolt includes a shaft and wherein the end of the bolt includes a head carried by the shaft, the head being rotatable relative to the shaft.

6. The apparatus of claim 3 wherein the member is parallel to the plate.

7. An object and assembly for effecting its movement, comprising:
    an object including a foot portion mounted on a base member, the foot portion and base member each including a throughbore, each throughbore having a diameter:
    a plate positioned between the foot portion and the base member, the plate including an opening at least partially aligned with the throughbores of the foot portion and base member, the opening including a diameter;
    a hold down bolt extending through the opening in the plate and the throughbores of the foot portion and base member, the hold down bolt including a diameter sufficiently smaller than the diameter of the opening and the diameters of the throughbores so as to permit radial movement of the hold down bolt relative to the opening and throughbores;
    a body attachable to the plate and having a bore extending therethrough; and
    a bolt extending through the bore, the bolt having an end positionable adjacent the object to be moved, the bolt further being rotatable within the bore to cause axial movement of the bolt within the bore and to thereby cause the end to push against the object to be moved, to thereby cause the object to slide relative to the plate and to further cause the hold down bolt to move radially within the opening and the throughbores.

* * * * *